(12) United States Patent
Oya et al.

(10) Patent No.: US 10,836,127 B2
(45) Date of Patent: Nov. 17, 2020

(54) POLARIZED LAMINATE AND EYE GLASSES

(71) Applicant: SUMITOMO BAKELITE CO., LTD., Shinagawa-ku (JP)

(72) Inventors: Hiroshi Oya, Shinagawa-ku (JP); Kazufusa Onodera, Shinagawa-ku (JP); Yohei Kamizaki, Shinagawa-ku (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

(21) Appl. No.: 16/337,518

(22) PCT Filed: Sep. 26, 2017

(86) PCT No.: PCT/JP2017/034759
§ 371 (c)(1),
(2) Date: Mar. 28, 2019

(87) PCT Pub. No.: WO2018/062187
PCT Pub. Date: Apr. 5, 2018

(65) Prior Publication Data
US 2019/0283349 A1    Sep. 19, 2019

(30) Foreign Application Priority Data

Sep. 29, 2016    (JP) ................................ 2016-191222
Sep. 29, 2016    (JP) ................................ 2016-191223
(Continued)

(51) Int. Cl.
*G02C 7/12*    (2006.01)
*B29D 11/00*    (2006.01)
(Continued)

(52) U.S. Cl.
CPC .. *B29D 11/00644* (2013.01); *B29D 11/00009* (2013.01); *B32B 27/34* (2013.01);
(Continued)

(58) Field of Classification Search
CPC . G02B 1/041; G02B 1/04; G02B 5/30; G02B 5/3025; G02C 7/10; G02C 7/12; G02C 2202/16; G02C 7/024
(Continued)

(56) References Cited

U.S. PATENT DOCUMENTS 8,703,296 B2 *    4/2014    Fujinaka ............ B29D 11/0073
428/474.7
2008/0094707 A1    4/2008    Tsukane et al.

FOREIGN PATENT DOCUMENTS

EP    1 804 088 A2    7/2007
JP    2005-138365 A    6/2005
(Continued)

OTHER PUBLICATIONS

Ems-Grivory, Grilamid TR, 36 pages, published by Sep. 30, 2013 at the latest.
(Continued)

*Primary Examiner* — Hung X Dang
(74) *Attorney, Agent, or Firm* — Oblon, McClelland, Maier & Neustadt, L.L.P.

(57) ABSTRACT

The polarized laminate of the invention includes a polarized film, which has a first surface and a second surface that is a reverse side of the first surface; a first layer provided on a side of the first surface and formed of a first resin material including a polyamide; and a second layer provided on a side of the second surface and formed of a second resin material including a polyamide. When a Barcol hardness of the polarized laminate before and after immersion of the polarized laminate in distilled water at 80° C. for 15 minutes is (Continued)

measured according to JIS K 7060:1995, the Barcol hardness after the immersion is from 70% to 100% with respect to the Barcol hardness before the immersion.

20 Claims, 2 Drawing Sheets

(30) Foreign Application Priority Data

Sep. 29, 2016 (JP) .................................. 2016-191224
Jun. 19, 2017 (JP) .................................. 2017-119783

(51) Int. Cl.
*G02B 1/14* (2015.01)
*B32B 27/34* (2006.01)
*G02B 5/30* (2006.01)

(52) U.S. Cl.
CPC ................. *G02B 1/14* (2015.01); *G02B 5/30* (2013.01); *G02B 5/3033* (2013.01); *G02C 7/12* (2013.01); *B32B 2307/42* (2013.01)

(58) Field of Classification Search
USPC ........................................ 351/49, 44, 159.27
See application file for complete search history.

(56) References Cited

FOREIGN PATENT DOCUMENTS

| JP | 2006-227591 A | 8/2006 |
| JP | 2007-093649 A | 4/2007 |
| JP | 2011-128331 A | 6/2011 |
| JP | 2012-215866 A | 11/2012 |
| WO | 2006-040954 A | 4/2006 |

OTHER PUBLICATIONS

International Search Report dated Dec. 19, 2017 in PCT/JP2017/034759 filed Sep. 26, 2017.
Notice of Reasons for Revocation, dated Jul. 17, 2019 in corresponding Japanese Patent No. 6414362, with English translation, 14 pages.
Certificate of Experimental Results, DJK Corporation, Apr. 11, 2019, 4 pages, Yokohama, Japan; 9 pages with English translation.
Notice of Reasons for Revocation, dated Dec. 5, 2019 in a corresponding Japanese Patent No. 6414362, with English translation, 41 pages.
Decision on Opposition, dated Apr. 24, 2020 in corresponding Japanese Patent No. 6414362, with English translation, 73 pages.

* cited by examiner

POLARIZED LAMINATE AND EYE GLASSES

TECHNICAL FIELD

The present invention relates to a polarized laminate and eye glasses.

BACKGROUND ART

For the purpose of glare proofing or protecting the eyes from wind and rain, dust, chemicals, and the like, sunglasses (including prescribed sunglasses), goggles, sun visors, and the like have been utilized. Furthermore, from the viewpoints of fashionability, lightweightness, and the like, frameless sunglasses are also utilized.

Conventionally, in sunglasses such as described above, a polarized laminate (lens) having a structure in which both surfaces of a polarized film are covered with a layer formed of a glass material or a plastic material, has been used (see, for example, PTL 1).

Regarding the plastic material that constitutes such a polarized laminate, polycarbonates and the like have been used.

However, in a case in which such a polarized laminate is fitted into or screw-fastened to a frame or the like, the fixing force for the polarized laminate is not sufficient. That is, when such a polarized laminate is subjected to processing such as drilling processing, cracks, fractures and the like may easily occur. As such, there has been a problem that processability (crack resistance) of polarized laminates is not sufficient.

CITATION LIST

Patent Literature

[PTL 1] JP-A-2011-128331

SUMMARY OF INVENTION

Technical Problem

An object of the present invention is to provide a polarized laminate that can retain stable product quality (particularly, polarization characteristics) for a long time and has excellent processability and durability (particularly, water resistance and weather resistance), and to provide eye glasses including the polarized laminate.

Solution to Problem

Such an object is achieved by the following items (1) to (11) of the present invention.

(1) A polarized laminate including:
a polarized film having a first surface and a second surface that is a reverse side of the first surface;
a first layer provided on a side of the first surface and formed of a first resin material including a polyamide; and
a second layer provided on a side of the second surface and formed of a second resin material including a polyamide,
in which when a Barcol hardness of the polarized laminate before and after immersion of the polarized laminate in distilled water at 80° C. for 15 minutes is measured according to JIS K 7060:1995, the Barcol hardness after the immersion is from 70% to 100% with respect to the Barcol hardness before the immersion.

(2) The polarized laminate according to the above item (1), in which the polyamide included in at least one of the first resin material and the second resin material has a glass transition temperature of from 140° C. to 190° C.

(3) The polarized laminate according to the above item (1) or (2), in which the polyamide included in at least one of the first resin material and the second resin material is an alicyclic polyamide.

(4) The polarized laminate according to any one of the above items (1) to (3), in which the polarized laminate is a lens for eye glasses.

(5) The polarized laminate according to any one of the above items (1) to (4), in which when the polarized laminate is used, the second surface having the second layer provided thereon faces an eye side of a user.

(6) The polarized laminate according to any one of the above items (1) to (5), in which the polarized laminate has a curved plate shape such that the first layer forms a convex surface.

(7) The polarized laminate according to any one of the above items (1) to (6), in which a retardation of the first layer is from 2,600 to 8,000, and a retardation of the second layer is from 0 to 500.

(8) The polarized laminate according to any one of the above items (1) to (7), in which a water absorption ratio of each of the first layer and the second layer as measured according to JIS K 7209:2000 is from 0.5% to 6.0%.

(9) The polarized laminate according to any one of the above items (1) to (8), in which the first resin material and the second resin material have different glass transition temperatures to each other.

(10) The polarized laminate according to the above item (9), in which a difference between the glass transition temperature of the first resin material and the glass transition temperature of the second resin material is from 3° C. to 35° C.

(11) Eye glasses including the polarized laminate according to any one of the above items (1) to (10).

Advantageous Effects of Invention

According to the present invention, a polarized laminate that can retain stable product quality (particularly, polarization characteristics) for a long time and has excellent processability and durability (particularly, water resistance and weather resistance) can be provided, and eye glasses including the polarized laminate can be provided.

DESCRIPTION OF EMBODIMENTS

Hereinafter, the polarized laminate and eye glasses of the present invention will be described in detail based on the suitable embodiments illustrated in the attached drawings.

Figure 1:
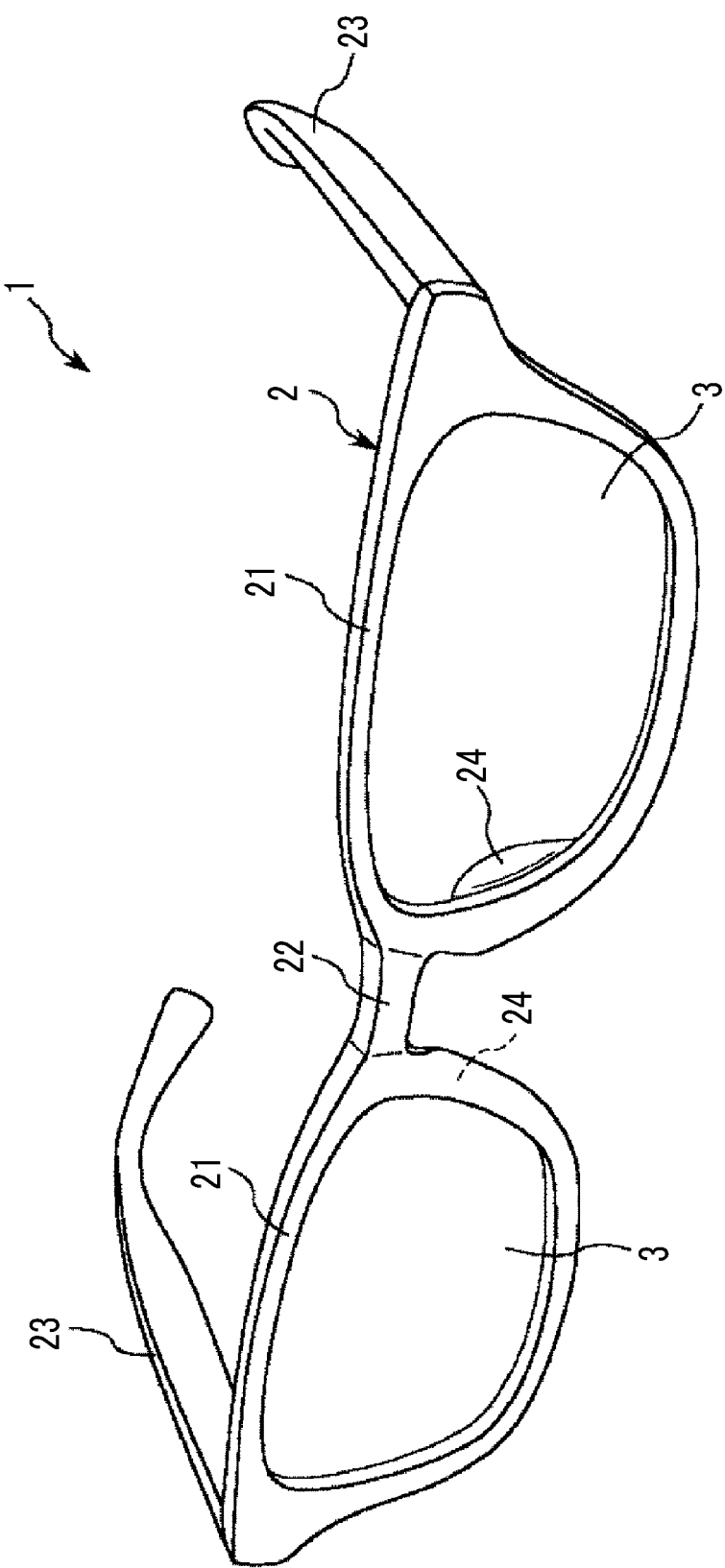
FIG. 1 is a perspective view illustrating sunglasses as an example of eye glasses of the present invention, which include a polarized laminate of the present invention.
Figure 2:
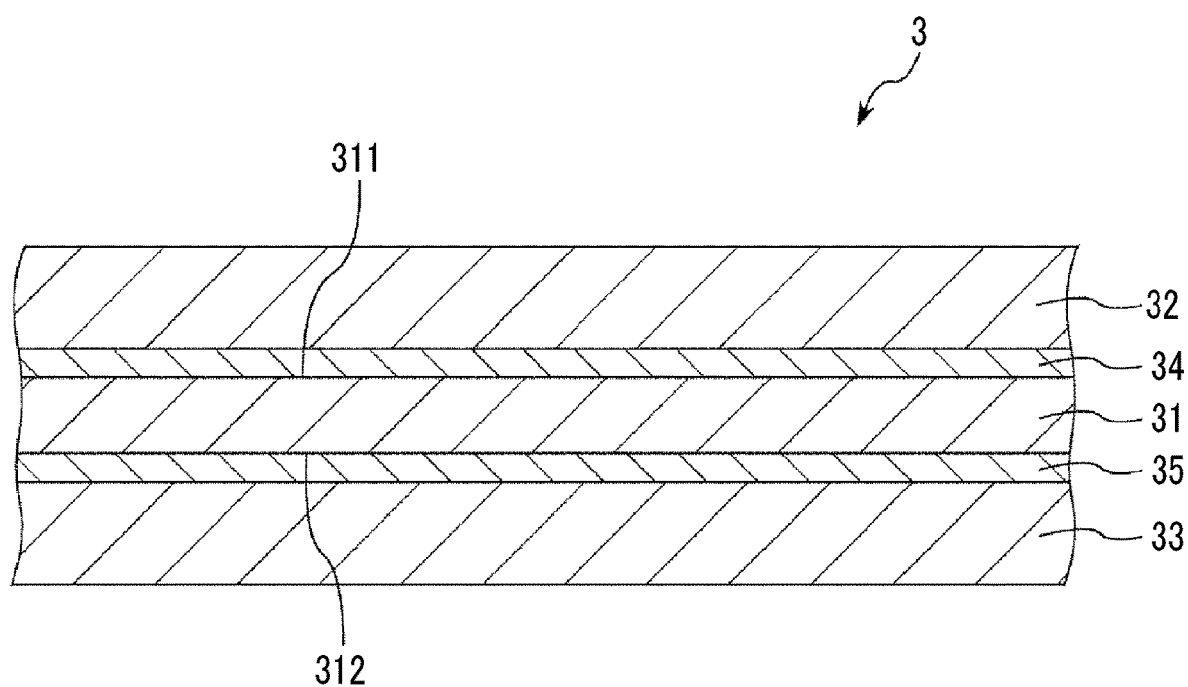
FIG. 2 is a magnified cross-sectional view of the polarized laminate of the present invention.

FIG. 1 is a perspective view illustrating sunglasses as an example of the eye glasses of the present invention, which include the polarized laminate of the present invention, and FIG. 2 is a magnified cross-sectional view of the polarized laminate of the present invention.

In FIG. 1 and FIG. 2, the upper side is also referred to as "upward" or "above", and the lower side is also referred to as "downward" or "below". In the drawings to be referred to in the present specification, some parts are illustrated in an exaggerated manner, and the drawings are significantly different from the actual dimensions.

As illustrated in FIG. 1, the sunglasses (eye glasses) 1 include a frame 2 to be worn on the head portion of the user; and polarized laminates (lenses) 3 fixed to the frame 2.

Meanwhile, the term "lens" according to the present specification includes both a prescribed lens (for example, a lens for near-sightedness, a lens for far-sightedness, and a lens for astigmatism) and a lens without optical correction.

The frame 2 has rim sections 21, abridge section 22, temple sections 23 that are hung up on the ears of the user, and nose pad sections 24, so that the frame is worn on the head portion of the user (FIG. 1).

Each of the rim sections 21 has a ring shape, and this is the part where a polarized laminate (lens) 3 on the inner side.

The bridge section 22 is a part that connects the respective rim sections 21.

Each of the temple sections 23 has a suspending shape and is connected to the edge of each rim section 21. This temple section 23 is the part that is hung on the ear of the user.

The nose pad sections 24 are the parts that come into contact with the nose of the user in a wearing state in which the sunglasses 1 are worn on the head portion of the user. Thereby, the wearing state can be maintained stably.

The material constituting this frame 2 is not particularly limited, and various metallic materials, various resin materials, and the like can be used.

The shape of the frame 2 is not limited to the shape illustrated in the diagram, as long as the frame can be worn on the head portion of the user.

Each of the rim sections 21 has a polarized laminate (lens) 3 mounted thereon.

The polarized laminate (lens) 3 can maintain stable product quality for a long time, as will be described below, and has excellent processability. Therefore, the sunglasses (eye glasses) 1 including the polarized laminate (lens) 3 can also maintain stable product quality for a long time.

As shown in FIG. 2, a polarized laminate (lens) 3 comprises a polarized film 31 that has a first surface 311 and a second surface 312 that is a surface on the reverse side of the first surface 311; a first layer (first polyamide layer) 32 that is disposed on the first surface 311 side and is formed of a first resin material including a polyamide; a second layer (second polyamide layer) 33 that is disposed on the second surface 312 side and is formed of a second resin material including a polyamide; an adhesive layer (first adhesive layer) 34 that is disposed between the polarized film 31 and the first layer 32 and joins (adheres) these; and an adhesive layer (second adhesive layer) 35 that is disposed between the polarized film 31 and the second layer 33 and joins (adheres) these.

As such, the side of one surface of the polarized film 31 is covered with the first layer 32 that is formed of a first resin material including a polyamide, and also, the side of the other surface of the polarized film 31 is covered with the second layer 33 that is formed of a second resin material including a polyamide. Thereby, in the polarized laminate 3, the polarized film 31 is suitably protected and can thus maintain excellent polarization characteristics over a long time period. Furthermore, since the polarized laminate 3 includes the first layer 32 that is formed of a first resin material including a polyamide having a relatively high elastic modulus, the polarized laminate 3 has excellent resistance to stress such as bending. Therefore, the polarized laminate 3 can exhibit an excellent fixing force when fitted into or screw-fastened to the frame 2. Furthermore, the polarized laminate 3 does not have cracks, fractures, and the like generated therein at the time of processing such as drilling processing. That is, the polarized laminate 3 has excellent processability. Furthermore, the materials including polyamides (first resin material and second resin material) enable easy control of the retardation by stretching, and the polarization characteristics of the polarized laminate 3 as a whole can be further enhanced.

In contrast, in a case in which the polarized laminate does not have a configuration such as described above, the excellent effects such as described above cannot be obtained.

For example, in a case in which at least one of the surfaces of the polarized film is not coated, scratches and the like are likely to be produced in the polarized film, and excellent polarization characteristics cannot be stably exhibited over a long time period.

The polarized laminate 3 may be applied to, for example, a goggle or a sun visor; however, it is preferable that the polarized laminate 3 is a lens for eye glasses, which is applied to eye glasses as described above.

The lens for eye glasses is generally such that a large load is exerted thereto at the time of fitting into a frame or processing such as screw fastening, and also, since the lens for eye glasses is used in a state of being worn on the human body, the harmful influence caused by fall-out of the lens for eye glasses or generation of cracks, fractures and the like at the time of use, is particularly significant. However, in this invention, even in a case in which the polarized laminate is applied to a lens for eye glasses, problems such as cracks and fractures can be effectively prevented at the time of processing. Even upon use, the occurrence of problems such as described above can be effectively prevented. Therefore, in a case in which the polarized laminate is applied to a lens for eye glasses, the effects provided by the invention are exhibited more noticeably.

Furthermore, the polarized laminate 3 (each of the first layer 32 and the second layer 33) has a feature described below (Barcol hardness ratio). That is, the polarized laminate 3 has the feature that when the polarized laminate 3 is immersed in distilled water at 80° C. for 15 minutes, and the Barcol hardnesses of the polarized laminate 3 before and after the immersion are measured according to JIS K 7060: 1995, the Barcol hardness after immersion is from 70% to 100% with respect to the Barcol hardness before immersion. Thereby, both processability and durability can be achieved at a higher level. Furthermore, the Barcol hardness ratio is preferably from 75% to 100%. Thereby, the above-described effects can be exhibited more noticeably.

Meanwhile, in the polarized laminate 3, the first layer 32 and the second layer 33 may face on either side at the time of use. However, in a case in which the first resin material and the second resin material have different characteristics (physical properties) as will be described below, it is preferable that the surface where the second layer 33 is provided is used in a state of facing the eye side of the user.

(Polarized Film)

The polarized film 31 has a function of extracting linearly polarized light having a plane of polarization in a predetermined one direction from incident light (natural light that is not polarized). Thereby, the incident light that enters the eye through the polarized laminate (lens) 3 is polarized.

The degree of polarization of the polarized film 31 is not particularly limited; however, the degree of polarization is preferably from 50% to 100%, and more preferably from 80% to 100%. Furthermore, the visible light transmittance of the polarized film 31 is not particularly limited; however, for example, the visible light transmittance is preferably from 10% to 80%, and more preferably from 20% to 50%.

The constituent material of such a polarized film 31 is not particularly limited as long as the material has the above-described functions; however, examples of the constituent material include a film obtained by subjecting a polymer film formed of polyvinyl alcohol (PVA), a partially formalated polyvinyl alcohol, polyethylene vinyl alcohol, polyvinyl butyral, polycarbonate, a partial saponification product of an ethylene-vinyl acetate copolymer, or the like to adsorption and dyeing with iodine or a dichroic substance such as a dichroic dye, and uniaxially stretching the film; and a polyene-based oriented film of a dehydration treated product of polyvinyl alcohol or a dehydrochloric acid treatment product of polyvinyl chloride.

Among thee, the polarized film 31 is preferably a film obtained by subjecting a polymer film containing polyvinyl alcohol (PVA) as a main material to adsorption and dyeing with iodine or a dichroic dye, and uniaxially stretching the film. Polyvinyl alcohol (PVA) is a material that is excellent in all of transparency, heat resistance, affinity with iodine or a dichroic dye, which are dyeing agents, and the orientation properties at the time of stretching. The polarized film 31 containing PVA as a main material has excellent heat resistance as well as an excellent polarization ability.

Examples of the dichroic dye include chloratine fast red, Congo Red, Brilliant Blue 6B, benzopurpurin, Chlorazol Black BH, Direct Blue 2B, Diamine Green, chrysophenine, Sirius Yellow, Direct Fast Red, and Acid Black.

The thickness of this polarized film 31 is not particularly limited, and the thickness is preferably from 5 µm to 60 µm, and more preferably from 10 µm to 40 µm.

(First Layer)

The first layer 32 is formed of a first resin material including a polyamide.

The polyamide may be a copolymer (a random copolymer, a block copolymer, or the like) including two or more kinds of monomers for at least one of dicarboxylic acid and diamine.

Examples of the polyamide include a semi-aromatic polyamide and an alicyclic polyamide. From the viewpoint of processability of the polarized laminate 3, a semi-aromatic polyamide is preferred, and from the viewpoint of the impact resistance of the polarized laminate 3, an alicyclic polyamide is preferred. Particularly, since the polarized laminate 3 includes a first layer 32 formed of the first resin material including an alicyclic polyamide, an effect that the impact resistance required for a lens for eye glasses can be secured is obtained.

In the present specification, a semi-aromatic polyamide refers to a polyamide in which one of a dicarboxylic acid and a diamine as the monomers that constitute the polyamide is an aromatic compound, while the other is an aliphatic compound.

In other words, the semi-aromatic polyamide can be represented by the following Formula (1).

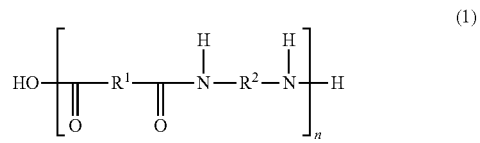

(Here, in Formula (1), $R^1$ and $R^2$ are such that one of them represents a divalent aromatic substituent, while the other represents a divalent aliphatic substituent, and n represents an integer of 2 or greater.)

The semi-aromatic polyamide is desirably a polyamide in which one of a dicarboxylic acid and a diamine as the monomers that constitute the polyamide is an aromatic compound, while the other is an aliphatic compound, and the semi-aromatic polyamide can be represented by Formula (1) shown above; however, a semi-aromatic polyamide satisfies the following conditions.

The aromatic substituent for $R^1$ and $R^2$ in Formula (1) is preferably a substituent represented by the following Formula (2).

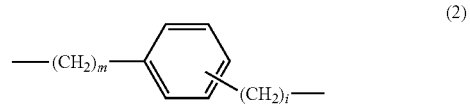

(Here, in Formula (2), 1 and m each independently represent an integer from 0 to 2.)

Thereby, the polarized film 31 can be protected more suitably, and also, the processability of the polarized laminate 3 can be further enhanced. Furthermore, control of the retardation of the first layer 32 by stretching can be carried out more easily.

The aliphatic substituent for $R^1$ and $R^2$ in Formula (1) is preferably a substituent having from 4 to 18 carbon atoms, more preferably a hydrocarbon group having from 4 to 18 carbon atoms, and even more preferably a saturated hydrocarbon group having from 4 to 18 carbon atoms.

Thereby, the processability of the polarized laminate 3 can be further enhanced.

It is preferable that the semi-aromatic polyamide includes an aromatic dicarboxylic acid and an aliphatic diamine as constituent monomers.

Thereby, the polarized film 31 can be protected more suitably, and also, the processability of the polarized laminate 3 can be further enhanced. Furthermore, control of the retardation of the first layer 32 by stretching can be carried out more easily.

Meanwhile, the semi-aromatic polyamide may include an aliphatic dicarboxylic acid and an aromatic diamine as constituent monomers.

Specific examples of the semi-aromatic polyamide included in the first layer 32 include, for example, compounds represented by the following Formula (3) to the following Formula (6).

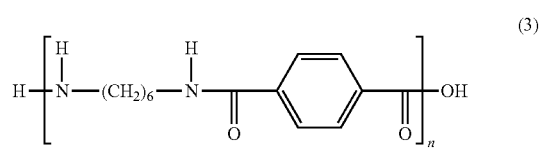

(Here, in Formula (3), n represents an integer of 2 or greater.)

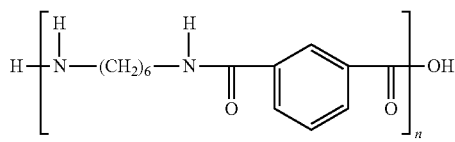

(4)

(Here, in Formula (4), n represents an integer of 2 or greater.)

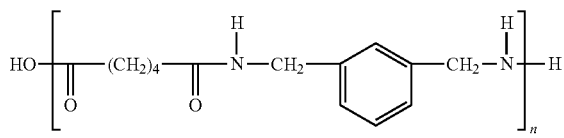

(5)

(Here, in Formula (5), n represents an integer of 2 or greater.)

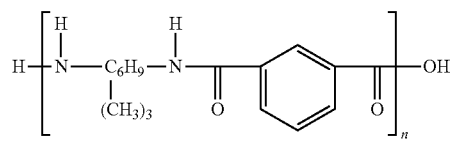

(6)

(Here, in Formula (6), n represents an integer of 2 or greater; and $C_6H_9$ represents a hydrocarbon group in a linear form.)

Thereby, the polarized film 31 can be protected more suitably, and also the processability of the polarized laminate 3 can be further enhanced. Furthermore, control of the retardation of the first layer 32 by stretching can be carried out more easily.

Regarding the semi-aromatic polyamide, for example, a copolymer represented by the following Formula (7) (block copolymer) can be used.

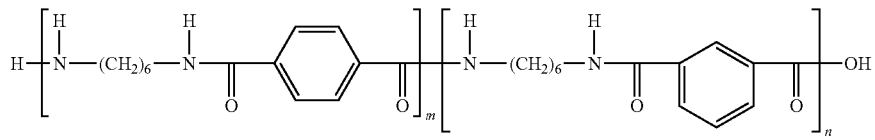

(7)

(Here, in Formula (7), m and n each independently represent an integer of 2 or greater.)

Thereby, control of the elastic modulus of the semi-aromatic polyamide or the close adhesiveness of the first layer 32 to the polarized film 31 can be carried out more suitably.

The alicyclic polyamide has an alicyclic chemical structure within the molecule, and the alicyclic polyamide may have an alicyclic chemical structure within the main chain structure or may have an alicyclic chemical structure within the side chain structure.

Regarding the alicyclicpolyamide, for example, a compound in which at least one of a dicarboxylic acid and a diamine as the monomers that constitute the polyamide has an alicyclic chemical structure.

The alicyclic polyamide is represented by, for example, the following Formula (8).

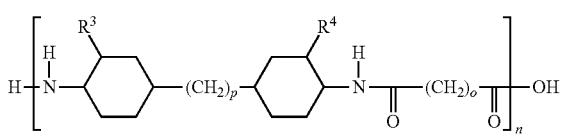

(8)

(Here, in Formula (8), $R^3$ and $R^4$ each independently represent a hydrogen atom or a hydrocarbon group having 4 or fewer carbon atoms; o represents an integer from 2 to 14; p represents an integer from 0 to 6; and n represents an integer of 2 or greater.)

Specific examples of the alicyclic polyamide that is included in the first layer 32 include, for example, alicyclic polyamides represented by the following Formula (9) and the following Formula (10).

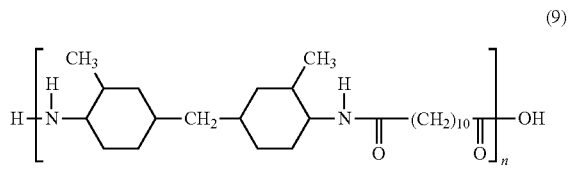

(9)

(Here, in Formula (9), n represents an integer of 2 or greater)

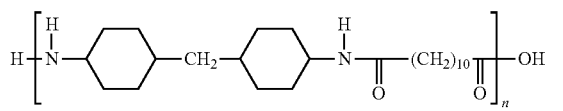

(10)

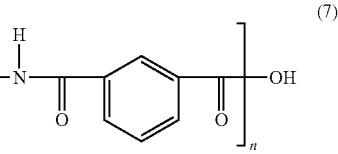

(Here, in Formula (10), n represents an integer of 2 or greater.)

The glass transition point (glass transition temperature) of the polyamide that is included in the first layer 32 is preferably from 140° C. to 190° C., more preferably from 140° C. to 180° C., even more preferably from 140° C. to 170° C., and particularly preferably from 150° C. to 170° C.

Thereby, both processability and durability of the polarized laminate 3 can be achieved at a higher level.

It is desirable that the first layer 32 includes a polyamide, and the first layer 32 may also include other components in addition to the polyamide. Examples of such components include a colorant such as a dye, a filler material, an alignment aid, a stabilizer (a thermal stabilizer, an ultraviolet absorber, an oxidation inhibitor, or the like), a plasticizer, a flame retardant, an antistatic agent, a viscosity adjusting agent, and a resin material other than a polyamide.

Examples of the dye include an acidic dye, a direct dye, a reactive dye, and a basic dye, and one kind or a combination of two or more kinds selected from these can be used.

Specific examples of the dye include, for example, C.I. Acid Yellow 17, 23, 42, 44, 79, and 142; C.I. Acid Red 52, 80, 82, 249, 254, and 289; C.I. Acid Blue 9, 45, and 249; C.I. Acid Black 1, 2, 24, and 94; C.I. Food Black 1 and 2; C.I. Direct Yellow 1, 12, 24, 33, 50, 55, 58, 86, 132, 142, 144, and 173; C.I. Direct Red 1, 4, 9, 80, 81, 225, and 227; C.I. Direct Blue 1, 2, 15, 71, 86, 87, 98, 165, 199, and 202, C.I. Direct Black 19, 38, 51, 71, 154, 168, 171, and 195; C.I. Reactive Red 14, 32, 55, 79, and 249; and C.I. Reactive Black 3, 4, and 35.

Examples of the filler material include borosilicic acid salts such as calcium borosilicate and aluminum borosilicate; and metal oxides such as $TiO_2$, $SnO_2$, ZnO, $Fe_2O_3$, $Fe_3O_4$, $SiO_2$, $Al_2O_3$, and $ZrO_2$.

The shape of the filler material is not particularly limited, and any shape such as a spherical shape or a scale shape may be used.

The color of the filler material may be colorless or may be any color such as red, blue, or yellow.

Regarding the alignment aid, an agent having a function of enhancing the degree of alignment of the particles that constitute the filler material can be used.

Specific examples of the alignment aid include, for example, alcohols such as methanol, ethanol, propanol, n-butanol, and t-butanol; carboxylic acids such as acetic acid, butyric acid, and benzoic acid; esters such as ethyl acetate and ethyl lactate; dimethyl phthalate, diethyl phthalate, dibutyl phthalate, di-2-ethylhexyl phthalate, diisodecyl phthalate, butyl benzyl phthalate, di-2-ethylhexyl adipate, di-n-alky610 adipate, di-2-ethylhexyl azelate, dibutyl sebacate, di-2-ethylhexyl sebacate, tributyl phosphate, tri-2-ethylhexyl phosphate, triphenyl phosphate, tricresyl phosphate, and tributyl acetylcitrate.

The percentage content of the polyamide in the first layer 32 is preferably 60% by mass or more, more preferably 70% by mass or more, and even more preferably 80% by mass or more.

Thereby, the effect obtainable by including the first layer 32 containing a polyamide as described above can be exhibited more noticeably.

The color of the first layer 32 may be colorless, or may be any color such as red, blue, or yellow.

The retardation (product of birefringence (Δn) and thickness (d)) of the first layer 32 is preferably from 2,600 to 8,000.

Thereby, even if the polarized laminate is subjected to bending process into a lens shape, iridescent color unevenness is not likely to occur, and an effect that decoloration does not occur is obtained.

Furthermore, the thickness of the first layer 32 is not particularly limited; however, the thickness is preferably from 100 μm to 800 μm, and more preferably from 200 μm to 600 μm.

The first layer 32 can be formed according to the following method. For example, a sheet material formed of a first resin material including a polyamide is obtained by extrusion molding. When the sheet material thus obtained is stretched while being heated at a predetermined temperature, the first layer 32 is formed. The retardation can be adjusted by means of the ratio of stretching the sheet material (draw ratio). Therefore, even in a case in which the first resin material that constitutes the first layer 32 and the second resin material that constitutes the second layer 33 are identical, the retardation of the first layer 32 and the retardation of the second layer 33 can be adjusted to be different from each other.

The sheet temperature at the time of stretching the sheet material is not particularly limited; however, the sheet temperature is preferably from 140° C. to 170° C., and more preferably from 145° C. to 165° C.

(Second Layer)

The second layer 33 is formed of a second resin material including a polyamide.

The polyamide to be used for the second layer 33 may be the same polyamide as the polyamide mentioned for the first layer 32. The glass transition point (glass transition temperature) of the polyamide included in the second layer 33 is preferably from 140° C. to 190° C., more preferably from 140° C. to 180° C., even more preferably from 140° C. to 170° C., and particularly preferably from 150° C. to 170° C. Thereby, both processability and durability of the polarized laminate 3 can be achieved at a higher level.

It is desirable that the second layer 33 includes a polyamide, and the second layer 33 may also include other components in addition to the polyamide. Examples of such components include a colorant such as a dye, a filler material, an alignment aid, a stabilizer (a thermal stabilizer, an ultraviolet absorber, an oxidation inhibitor, or the like), a plasticizer, a flame retardant, an antistatic agent, a viscosity adjusting agent, and a resin material other than polyamide.

The percentage content of the polyamide in the second layer 33 is preferably 60% by mass or more, more preferably 70% or more, and even more preferably 80% by mass or more.

Thereby, by including the second layer 33, an effect similar to the effect obtainable by including the first layer 32 containing a polyamide as described above can be exhibited more noticeably.

The color of the second layer 33 may be colorless, or may be any color such as red, blue, or yellow.

The retardation (product of birefringence (Δn) and thickness (d)) of the second layer 33 is preferably from 0 to 500. Thereby, the polarized laminate 3 can achieve both relatively high strength and lightweightness at a higher level. Furthermore, by including a second layer 33 formed of a second resin material including a polyamide and having a retardation of from 0 to 500 in addition to a first layer 32 formed of a first resin material including a polyamide and having a retardation of from 2,600 to 8,000, both processability and durability of the polarized laminate 3 can be achieved at a particularly high level.

The thickness of the second layer 33 is not particularly limited; however, the thickness is preferably from 50 μm to 500 μm, and more preferably from 100 μm to 300 μm.

The second layer 33 can be formed by a method similar to the method for forming the first layer 32. For example, the second layer 33 can be suitably formed by joining a sheet material formed of the second resin material including a polyamide with the polarized film 31.

(First Adhesive Layer)

Between the polarized film 31 and the first layer 32, an adhesive layer (first adhesive layer) 34 joining (adhering) these is provided.

Thereby, durability and the like of the polarized laminate 3 can be particularly enhanced.

The adhesive (or pressure-sensitive adhesive) that constitutes the adhesive layer 34 is not particularly limited, and examples include an acrylic adhesive, a urethane-based adhesive, an epoxy-based adhesive, and a silicone-based adhesive.

Among these, a urethane-based adhesive is preferred. By using this, the conformity to shape change can be particularly enhanced while transparency, adhesive strength, and durability of the adhesive layer 34 are further enhanced. As a result, a polarized laminate 3 capable of coping with suitability to various processing such as bending processing can be produced.

Particularly, it is preferable that the adhesive layer 34 is formed by the method described below. First, a two-liquid type urethane-based adhesive is applied on the first layer 32, and a coating layer is obtained. Next, the coating layer is subjected to a first treatment by which a curing reaction is carried out in an environment with low humidity, and to a second treatment that is carried out at a higher temperature than the first treatment, and thereby the adhesive layer 34 is formed.

Thereby, it can be prevented that the amount of NCO groups becomes excessive with respect to the hydroxyl groups of the main agent. That is, the amount of NCO groups can be suitably adjusted so as to become a suitable amount corresponding to the hydroxyl groups of the main agent. In addition, the formation of urethane bonds is suitably carried out in the early stage of the curing reaction (polymerization reaction), and air bubbles caused by the generation of carbon dioxide can be effectively prevented from exerting adverse influence on the external appearance and functions of the polarized laminate 3. Furthermore, productivity of the polarized laminate 3 can be increased.

The humidity at the time of performing the first treatment is preferably 60% RH or lower, and more preferably 55% RH or lower.

Thereby, side reactions generating carbon dioxide can be prevented and suppressed more effectively, and the effects such as described above are exhibited more noticeably.

The temperature employed at the time of performing the first treatment is preferably from 10° C. to 30° C.

Thereby, side reactions generating carbon dioxide can be prevented and suppressed more effectively, and at the same time, productivity of the polarized laminate 3 can be further increased.

The treatment time for the first treatment is preferably from 12 hours to 60 hours, and more preferably from 18 hours to 48 hours.

Thereby, productivity of the polarized laminate 3 can be further increased while the intended reaction for forming a urethane bonded is sufficiently carried out.

It is preferable that the temperature employed at the time of performing the second treatment is higher than the treatment temperature for the first treatment, and specifically, the temperature is preferably from 30° C. to 50° C.

Thereby, productivity of the polarized laminate 3 can be further increased while unintended deterioration of the product quality of the polarized laminate 3 is prevented more reliably.

The treatment time for the second treatment is preferably from 12 hours to 60 hours, and more preferably from 18 hours to 48 hours.

Thereby, productivity of the polarized laminate 3 can be further increased while unintended deterioration of the product quality of the polarized laminate 3 is prevented more reliably.

Furthermore, the adhesive layer 34 may also include components other than an adhesive (or pressure-sensitive adhesive).

Examples of such components include a stabilizer (a thermal stabilizer, an ultraviolet absorber, an oxidation inhibitor, or the like), a plasticizer, a colorant, a flame retardant, an antistatic agent, and a viscosity adjusting agent.

The percentage content of the adhesive in the adhesive layer 34 is preferably 50% by mass or more, and more preferably 60% by mass or more.

The thickness of the adhesive layer 34 is not particularly limited; however, for example, the thickness is preferably from 0.1 μm to 80 μm, more preferably from 1 μm to 60 μm, and even more preferably from 2 μm to 50 μm.

Thereby, durability, processability, and the like of the polarized laminate 3 can be further enhanced while the optical characteristics of the polarized laminate 3 are further enhanced.

(Second Adhesive Layer)

Between the polarized film 31 and the second layer 33, an adhesive layer (second adhesive layer) 35 joining (adhering) these is provided.

Thereby, durability and the like of the polarized laminate 3 can be particularly enhanced.

It is preferable that the adhesive layer (second adhesive layer) 35 satisfies conditions that are similar to the conditions for the adhesive layer (first adhesive layer) 34 described above.

Thereby, the second adhesive layer 35 can exhibit effects similar to the above-described effects that are obtained by the first adhesive layer 34.

In FIG. 2, a portion of the polarized laminate 3 is illustrated in a flat plate form as a magnified cross-sectional view; however, regarding the polarized laminate 3 as a whole, the shape is not limited to a flat plate shape, and any shape may be employed. For example, the polarized laminate 3 may have a plano-convex lens shape, a plano-concave lens shape, a biconvex lens shape, a biconcave lens shape, or a concavo-convex lens.

Particularly, in a case in which the polarized laminate 3 has a curved plate shape, it is preferable that the first layer 32 is provided on the convex surface side. That is, it is preferable that the polarized laminate 3 has a curved plate shape such that the first layer 32 constitutes the convex surface.

The first layer 32 configured as such can easily maintain high retardation, compared to the layer provided on the concave surface side of the polarized laminate and formed of a material including a polyamide.

The thickness of the polarized laminate 3 (in regard to the state of use of the polarized laminate 3, the thickness of the site where the light entering the eye of the user enters in the polarized laminate 3) is not particularly limited; however, the thickness is preferably from 0.4 mm to 5.0 mm, more preferably from 0.5 mm to 5.0 mm, even more preferably from 0.5 mm to 3.0 mm, and particularly preferably from 0.65 mm to 3.0 mm.

Thereby, the polarized laminate 3 can achieve both relatively high strength and lightweightness at a higher level.

The water absorption ratio of the first layer 32 or the second layer 33 as measured according to JIS K 7209:2000 is preferably from 0.5% to 6.0%. Furthermore, it is more preferable that the water absorption ratios of both the first layer 32 and the second layer 33 are in the range described above.

Thereby, both processability and durability of the polarized laminate 3 can be achieved at a higher level.

Regarding the first resin material and the second resin material, there may be a difference between the glass transition temperatures. In this case, a layer having a lower glass transition temperature between the first layer 32 and the second layer 33, can be suitably subjected to stretching for exhibiting retardation. Therefore, a polarized laminate 3 having excellent processability and excellent overall polarization characteristics is obtained.

For example, in a case in which the glass transition temperature of the first resin material that constitutes the first layer 32 is lower than the glass transition temperature of the second resin material that constitutes the second layer 33, the first layer 32 can be suitably subjected to stretching for exhibiting retardation at a relatively low temperature. Therefore, the polarized laminate 3 has excellent processability. Furthermore, by adjusting the direction of stretching to coincide with the direction of polarization of the polarized film 31, the polarization characteristics of the first layer 32 are combined with the polarization characteristics of the polarized film 31, and thereby the polarized laminate 3 has excellent polarization characteristics.

In a case in which there is a difference between the glass transition temperature of the first resin material and the glass transition temperature of the second resin material, the difference between these glass transition temperatures is preferably from 3° C. to 35° C., and more preferably from 15° C. to 30° C. Thereby, the above-described effects can be exhibited more reliably, and a polarized laminate 3 having excellent reliability can be obtained. Furthermore, selection of the material for the first resin material and the second resin material becomes relatively easy. The difference between the glass transition temperatures of the first resin material and the second resin material can be exhibited by, for example, making the compositions of the monomer components of the polyamide different, or by making the degrees of polymerization different.

Thus, suitable embodiments of the present invention have been described; however, the invention is not intended to be limited to the above-described embodiments, and modifications, improvements, and the like to the extent that can achieve the purpose of the invention are included in the invention.

For example, the various parts that constitute the polarized laminate and eye glasses of the invention can be substituted with members of any arbitrary configurations that can exhibit similar functions.

Furthermore, the polarized laminate and eye glasses of the invention may have any arbitrary constituent members added to the configurations described above.

More specifically, for example, the polarized laminate of the invention may include a protective layer that protects the surface of the first layer, an intermediate layer, or a dioptric power adjusting layer that adjusts the dioptric power as a lens.

The constituent materials for the protective layer, the intermediate layer, and the dioptric power adjusting layer are not particularly limited, and examples include various resin materials including polyester-based resins such as polyethylene terephthalate (PET), polybutylene terephthalate (PBT), and polyethylene naphthalate (PEN); polyolefin-based resins such as polyethylene and polypropylene; polyimide-based resins, polyamide-based resins, polycarbonate-based resins, polyurethane-based resins; acrylic resins such as polymethyl methacrylate; acetate-based resin, allyl-based resins, and silicone-based resins. However, among these, resin materials including polyamide-based resins, polycarbonate-based resins, polyurethane-based resins, acrylic resins, allyl-based resins, and silicone-based resins as main materials are preferably used.

Particularly, examples of the constituent material for the dioptric power adjusting layer include resin materials including polyolefins such as polyethylene, polypropylene, and an ethylene-propylene copolymer; polyvinyl chloride, polystyrene, polyamide, polyimide, polycarbonate, poly-(4-methylpenten-1), an ionomer, acrylic resins, polymethyl methacrylate, an acrylonitrile-butadiene-styrene copolymer (ABS resin), an acrylonitrile-styrene copolymer (AS resin), a butadiene-styrene copolymer, polyesters such as polyethylene terephthalate (PET) and polybutylene terephthalate (PBT), polyether, polyether ketone (PEK), polyether ether ketone (PEEK), polyetherimide, polyacetal (POM), polyphenylene oxide, polysulfone, polyether sulfone, polyphenylene sulfide, polyallylate, an aromatic polyester (liquid crystal polymer), polytetrafluoroethylene, polyvinylidene fluoride, other fluorine-based resins, an epoxy resin, a phenolic resin, a urea resin, a melamine resin, a silicone resin, polyurethane; and copolymers or blends containing these as main components; and polymer alloys; glass materials such as soda glass, crystalline glass, quartz glass, lead glass, potassium glass, borosilicate glass, and alkali-free glass; and various crystals such as sapphire and rock crystal.

EXAMPLES

Hereinafter, the present invention will be described in detail based on Examples; however, the invention is not intended to be limited to these.

Example 1

<Production of Polarized Laminate>

First, a polyvinyl alcohol-based film was dyed in an aqueous solution containing a dye dissolved therein, while being stretched in the water tank, and the resultant was treated with boric acid. Subsequently, the polyvinyl alcohol-based film thus treated was washed with water and dried. Thereby, a polarized film having a thickness of 35 μm was obtained.

Meanwhile, by using a polyamide resin (GRILAMID TR90 manufactured by EMS Chemie Holding AG) as a first resin material, a first sheet having a thickness of 0.5 mm was obtained by extrusion molding using a vent type single-screw extruder. The first sheet was uniaxially stretched to 1.5 times the original length while being heated to obtain a sheet temperature of 140° C., and thereby a sheet-like first layer having a thickness of 0.4 mm was obtained.

Furthermore, by using a polyamide resin (GRILAMID TR90 manufactured by EMS Chemie Holding AG) as a second resin material, a sheet-like second layer having a thickness of 0.2 mm was obtained by extrusion molding using a vent type single-screw extruder.

Next, a two-liquid type moisture-curable polyurethane adhesive (main agent: TAKELAC A-520 manufactured by Mitsui Chemicals, Inc., curing agent: TAKENATE A-50 manufactured by Mitsui Chemicals, Inc.) was applied as a first adhesive on one surface of the first layer with a bar coater such that the thickness after drying would be 20 μm. Furthermore, a two-liquid type moisture-curable polyurethane adhesive (main agent: TAKELAC A-520 manufactured by Mitsui Chemicals, Inc., curing agent: TAKENATE A-50 manufactured by Mitsui Chemicals, Inc.) was applied as a second adhesive on one surface of the second layer with a bar coater such that the thickness after drying would be 20 μm.

Next, the first layer and the second layer having the first adhesive and the second adhesive respectively applied thereon were placed in an oven and heated until the solvent portions in the first adhesive and the second adhesive dried up. Thereby, a first laminate having an adhesive layer (first adhesive layer) laminated on one surface of the first layer was obtained, and also, a second laminate having an adhesive layer (second adhesive layer) laminated on one surface of the second layer was obtained.

Subsequently, the first laminate was laminated on the polarized film such that the first adhesive layer came into contact with one surface of the polarized film, and the second laminate was laminated on the polarized film such that the second adhesive layer came into contact with the other surface of the polarized film. Thus, a polarized laminate was obtained. At this time, the first laminate, the polarized film, and the second laminate were respectively compressed using rubber rolls of a laminator machine, and thereby the total thickness of the polarized laminate was adjusted to 0.75 mm.

The polyamide resin, which was the first resin material and the second resin material that constituted the first layer and the second layer, respectively, mainly included an alicyclic polyamide. Furthermore, the Barcol hardness ratio and water absorption ratio of the polarized laminate thus obtained were measured by the following methods.

For the polarized laminate (first layer and second layer, respectively) thus obtained, the Barcol hardness was measured according to JIS K 7060:1995, and the Barcol hardness values before immersion (value $x_1$ of the Barcol hardness of the first layer before immersion and value $x_2$ of the Barcol hardness of the second layer) were obtained. Next, the polarized laminate was immersed in distilled water at 80° C. for 15 minutes, and then the Barcol hardness of the polarized laminate was measured. Thus, the Barcol hardness values after immersion (value $y_1$ of the Barcol hardness of the first layer after immersion and value $y_2$ of the Barcol hardness of the second layer) were obtained. The ratios of the Barcol hardness values after immersion $y_1$ and $y_2$ with respect to the Barcol hardness values before immersion $x_1$ and $x_2$ were respectively calculated, and the Barcol hardness ratio of the first layer ($100 \times y_1/x_1$) and the Barcol hardness ratio of the second layer ($100 \times y_2/x_2$) were obtained.

Furthermore, the water absorption ratios of the first layer and the second layer were respectively measured according to JIS K 7209:2000. These results are summarized in Table 1.

Example 2 to Example 4 and Comparative Example 1

Polarized laminates of Example 2 to Example 9 and Comparative Example 1 to Comparative Example 2 were obtained in the same manner as in Example 1, except that the configuration of the polarized laminate was changed as shown in Table 1. At the time of changing the configuration of the polarized laminate, the thicknesses of the first sheet and the second sheet were adjusted.

In Table 1, A-1 represents an alicyclic polyamide having a glass transition temperature of 155° C. (GRILAMID TR90 manufactured by EMS Chemie Holding AG); A-2 represents an alicyclic polyamide having a glass transition temperature of 125° C. (TR90LX manufactured by EMS Chemie Holding AG); A-3 represents an alicyclic polyamide having a glass transition temperature of 140° C. (TROGAMID CX manufactured by Daicel-Evonik, Ltd.); B-1 represents a semi-aromatic polyamide having a glass transition temperature of 125° C. (GRIVORY G21 manufactured by EMS Chemie Holding AG); C-1 represents aliphatic polyamide TR55 (manufactured by EMS Chemie Holding AG) having a glass transition temperature of 160° C.; and D-1 represents aliphatic polyamide TR55LX (manufactured by EMS Chemie Holding AG) having a glass transition temperature of 110° C.

1. Evaluation of External Appearance

An evaluation of the external appearance was performed for the polarized laminates produced in various Examples and Comparative Examples. These evaluation methods will be explained below.

(1) Status of Generation of Iridescent Pattern

Each of the polarized laminates of various Examples and Comparative Examples was punched into a size that measured 6 cm on each side, and thus a specimen was obtained. This specimen was preliminarily dried for one day at 60° C. The dried specimen was inserted into a concave mold having a radius of curvature of 87 mm (6-curve) in a REMA molding machine (vacuum molding machine) CR-32 type, and the specimen was subjected to heat bending while suctioning was performed for 4 minutes at 143° C. Thereby, a polarized lens was produced.

The polarized lens thus produced was mounted on a backlight with a polarizer such that the first layer would face downward, and an observation of the external appearance by means of transmitted light was performed in the state of both crossed Nicole and parallel Nicole. At this time, it was checked whether an iridescent pattern caused by colored interference fringes was produced, based on the following evaluation criteria.

Grades A and B mean that the specimen is acceptable, and grade C means the specimen is unacceptable.

A: No production of iridescent pattern

B: Partial production of an iridescent pattern occurred, but there is no problem for practical use.

C: Production of an iridescent pattern occurred in the overall, and there is a problem for practical use.

(2) Status of Occurrence of Bleaching

Each of the polarized laminates of various Examples and Comparative Examples was punched into a size that measured 6 cm on each side, and thus a specimen was obtained. This specimen was preliminarily dried for one day at 60° C. The dried specimen was inserted into a concave mold having a radius of curvature of 87 mm (6-curve) in a REMA molding machine (vacuum molding machine) CR-32 type, and the specimen was subjected to heat bending while suctioning was performed for 4 minutes at 143° C. Thereby, a polarized lens was produced.

The polarized lens thus produced was mounted on a backlight with a polarizer such that the first layer would face downward, and an observation of the external appearance by means of transmitted light was performed in the state of both crossed Nicole and parallel Nicole. At this time, it was checked whether bleaching occurred, that is, whether any transmitted light was generated, based on the following evaluation criteria.

Grade A means that the specimen is acceptable, and grade B means the specimen is unacceptable.

A: No occurrence of bleaching

B: Bleaching partially occurred.

2. Evaluation of Processability

Each of the polarized laminates produced in various Examples and Comparative Examples was subjected to drilling processing using a lens processing machine (manufactured by Takubo Machine Works Co., Ltd., DM-3). The diameter of the hole was 2 mm. At this time, the processability of the polarized laminate was evaluated based on the following evaluation criteria.

Grades A and B mean that the specimen is acceptable, and grade C means that the specimen is unacceptable.

A: No generation of cracks.

B: Cracks were slightly generated, but there is no problem for practical use.

C: Cracks were generated, and there is a problem for practical use.

3. Evaluation of Water Resistance

Each of the polarized laminates of various Examples and Comparative Examples was punched into a size that measured 6 cm on each side, and thus a specimen was obtained. This specimen was preliminarily dried for one day at 60° C. The dried specimen was inserted into a concave mold having a radius of curvature of 87 mm (6-curve) in a REMA molding machine (vacuum molding machine) CR-32 type, and the specimen was subjected to heat bending while suctioning was performed for 4 minutes at 143° C. Thereby, a polarized lens was produced.

The polarized lens thus produced was immersed in pure water at 60° C. for 30 minutes, and then the polarized lens was taken out. The polarized lens was cooled to room temperature and dried. Subsequently, the water resistance of the polarized lens (polarized laminate) was evaluated based on the following evaluation criteria.

Grades A and B mean that the specimen is acceptable, and grade C means that the specimen is unacceptable.

A: The reduction ratio of the mass of the polarized lens was 0.2% or less, compared to the mass before immersion.

B: The reduction ratio of the mass of the polarized lens was more than 0.2% and less than 1.0%, compared to the mass before immersion.

C: The reduction ratio of the mass of the polarized lens was 1.0% or more, compared to the mass before immersion.

4. Evaluation of Weather Resistance

Each of the polarized laminates of various Examples and Comparative Examples was punched into a size that measured 6 cm on each side, and thus a specimen was obtained. This specimen was preliminarily dried for one day at 60° C. The dried specimen was inserted into a concave mold having a radius of curvature of 87 mm (6-curve) in a REMA molding machine (vacuum molding machine) CR-32 type, and the specimen was subjected to heat bending while suctioning was performed for 4 minutes at 143° C. Thereby, a polarized lens was produced.

The polarized lens thus produced was immersed in pure water at 60° C. for 30 minutes, and then the polarized lens was taken out. The polarized lens was cooled to room temperature and dried. Subsequently, the weather resistance of the polarized lens (polarized laminate) was evaluated based on the following evaluation criteria.

Grades A and B mean that the specimen is acceptable, and grade C means that the specimen is unacceptable.

A: The haze of the polarized lens after immersion was 0.2% or lower.

B: The haze of the polarized lens after immersion was higher than 0.2° and lower than 1.0°.

C: The haze of the polarized lens after immersion was 1.0° or higher.

These results are summarized in Table 1.

TABLE 1

| | | Example 1 | Example 2 | Example 3 | Example 4 | Example 5 | Example 6 | Example 7 | Example 8 | Example 9 | Comparative Example 1 | Comparative Example 2 |
|---|---|---|---|---|---|---|---|---|---|---|---|---|
| First layer | First resin material | A-1 | A-1 | A-1 | A-1 | A-1 | A-1 | A-1 | A-3 | B-1 | C-1 | D-1 |
| | Film thickness (mm) | 0.4 | 0.8 | 0.8 | 0.1 | 0.8 | 0.4 | 0.4 | 0.6 | 0.6 | 0.4 | 0.4 |
| | Draw ratio | 1.5 | 1.5 | 1.7 | 2.0 | 1.8 | 1.6 | 1.5 | 1.7 | 1.7 | 1.5 | 1.5 |
| | Retardation | 2600 | 5000 | 8000 | 2100 | 9500 | 3200 | 2600 | 5000 | 5000 | 3200 | 3100 |
| | Water absorption ratio (%) | 3.0 | 3.0 | 3.0 | 3.0 | 3.0 | 3.0 | 3.0 | 3.5 | 7.0 | 3.5 | 2.0 |
| | Barcol hardness ratio | 78% | 91% | 98% | 71% | 98% | 85% | 82% | 88% | 70% | 45% | 30% |
| Second layer | Second resin material | A-1 | A-1 | A-1 | A-1 | A-1 | A-1 | A-2 | A-3 | B-1 | C-1 | D-1 |
| | Film thickness (mm) | 0.2 | 0.3 | 0.4 | 0.3 | 0.3 | 0.4 | 0.2 | 0.2 | 0.2 | 0.2 | 0.2 |
| | Draw ratio | 1.0 | 1.0 | 1.0 | 1.0 | 1.0 | 1.6 | 1.0 | 1.0 | 1.0 | 1.0 | 1.0 |
| | Retardation | 0 | 240 | 500 | 240 | 300 | 3200 | 0 | 100 | 100 | 0 | 0 |
| | Water absorption ratio (%) | 3.0 | 3.0 | 3.0 | 3.0 | 3.0 | 3.0 | 3.0 | 3.5 | 7.0 | 3.5 | 2.0 |
| | Barcol hardness ratio | 78% | 91% | 98% | 71% | 98% | 85% | 82% | 88% | 70% | 45% | 30% |
| External appearance (iridescent pattern) | | A | A | A | B | A | A | A | A | A | B | B |
| Bleaching | | A | A | A | A | A | A | A | A | A | B | B |
| Processability | | A | A | A | A | B | B | A | A | B | C | C |
| Water resistance | | A | A | A | A | B | A | A | A | A | B | C |
| Weather resistance | | A | A | A | A | B | A | A | A | B | B | C |

In the polarized laminates of the various Examples, the generation of an iridescent pattern and the occurrence of bleaching were suppressed compared to the polarized laminates of the various Comparative Examples, and excellent results were obtained for processability and durability (water resistance and weather resistance). Therefore, the polarized laminates of the various Examples can maintain stable product quality for a longtime at a level equal or superior to that of conventional products, and have excellent processability and durability.

INDUSTRIAL APPLICABILITY

The polarized laminate of the invention includes a polarized film having a first surface and a second surface that is a reverse side of the first surface; a first layer provided on a side of the first surface and formed of a first resin material including a polyamide; and a second layer provided on a side of the second surface and formed of a second resin material including a polyamide. Furthermore, when a Barcol hardness of the polarized laminate is measured before and after the polarized laminate is immersed in distilled water at 80° C. for 15 minutes according to JIS K 7060:1995, the Barcol hardness after the immersion is from 70% to 100% with respect to the Barcol hardness before the immersion. Thereby, a polarized laminate that can maintain stable product quality for a long time and has excellent processability and durability can be provided, and eye glasses including the polarized laminate can be provided. Therefore, the present invention has industrial applicability.

REFERENCE SIGNS LIST

1 Sunglasses (eye glasses)
2 Frame
21 Rim section
22 Bridge section
23 Temple section
24 Nose pad section
Polarized laminate (lens)
31 Polarized film
311 First surface
312 Second surface
32 First layer (first polyamide layer)
33 Second layer (second polyamide layer)
34 Adhesive layer (first adhesive layer)
35 Adhesive layer (second adhesive layer)

The invention claimed is:

1. A polarized laminate, comprising:
a polarized film having a first surface and a second surface that is a reverse side of the first surface;
a first layer provided on the first surface and formed of a first resin material including an alicyclic polyamide; and
a second layer provided on the second surface and formed of a second resin material including an alicyclic polyamide,
wherein the first layer has a retardation of from 2,600 to 8,000, the second layer has a retardation of from 0 to 500, and when a Barcol hardness of the polarized laminate before and after immersion of the polarized laminate in distilled water at 80° C. for 15 minutes is measured according to JIS K 7060:1995, the Barcol hardness after the immersion is from 70% to 100% with respect to the Barcol hardness before the immersion.

2. The polarized laminate according to claim 1, wherein the polyamide included in at least one of the first resin material and the second resin material has a glass transition temperature of from 140° C. to 190° C.

3. The polarized laminate according to claim 2, wherein the first layer and the second layer are joined to the first surface and the second surface respectively by an adhesive.

4. The polarized laminate according to claim 2, wherein the polarized laminate has a curved plate shape such that the first layer forms a convex surface.

5. The polarized laminate according to claim 2, wherein a water absorption ratio of each of the first layer and the second layer as measured according to JIS K 7209:2000 is from 0.5% to 6.0%.

6. The polarized laminate according to claim 2, wherein the first resin material and the second resin material have different glass transition temperatures to each other.

7. The polarized laminate according to claim 6, wherein a difference between the glass transition temperature of the first resin material and the glass transition temperature of the second resin material is from 3° C. to 35° C.

8. Eye glasses comprising the polarized laminate of claim 2.

9. The polarized laminate according to claim 1, wherein the first layer and the second layer are joined to the first surface and the second surface respectively by an adhesive.

10. The polarized laminate according to claim 9, wherein the polarized laminate has a curved plate shape such that the first layer forms a convex surface.

11. The polarized laminate according to claim 9, wherein a water absorption ratio of each of the first layer and the second layer as measured according to JIS K 7209:2000 is from 0.5% to 6.0%.

12. The polarized laminate according to claim 9, wherein the first resin material and the second resin material have different glass transition temperatures to each other.

13. The polarized laminate according to claim 12, wherein a difference between the glass transition temperature of the first resin material and the glass transition temperature of the second resin material is from 3° C. to 35° C.

14. The polarized laminate according to claim 1, wherein the polarized laminate is a lens for eye glasses.

15. The polarized laminate according to claim 1 wherein when the polarized laminate is used, the second surface having the second layer provided thereon faces an eye side of a user.

16. The polarized laminate according to claim 1 wherein the polarized laminate has a curved plate shape such that the first layer forms a convex surface.

17. The polarized laminate according to claim 1 wherein a water absorption ratio of each of the first layer and the second layer as measured according to JIS K 7209:2000 is from 0.5% to 6.0%.

18. The polarized laminate according to claim 1 wherein the first resin material and the second resin material have different glass transition temperatures to each other.

19. The polarized laminate according to claim 18, wherein a difference between the glass transition temperature of the first resin material and the glass transition temperature of the second resin material is from 3° C. to 35° C.

20. Eye glasses comprising the polarized laminate of claim 1.

* * * * *